(12) United States Patent
Popalis et al.

(10) Patent No.: US 9,563,234 B2
(45) Date of Patent: Feb. 7, 2017

(54) MODULAR WEARABLE COMPUTING DEVICE

(71) Applicant: Arrow Technologies Inc., Markham (CA)

(72) Inventors: George Popalis, Newmarket (CA); Daniel Kiriakou, Richmond Hill (CA)

(73) Assignee: Arrow Technologies Inc., Markham, Ontario (CA)

( * ) Notice: Subject to any disclaimer, the term of this patent is extended or adjusted under 35 U.S.C. 154(b) by 0 days.

(21) Appl. No.: 14/723,975

(22) Filed: May 28, 2015

(65) Prior Publication Data

US 2015/0346768 A1 Dec. 3, 2015

Related U.S. Application Data

(60) Provisional application No. 62/005,441, filed on May 30, 2014.

(51) Int. Cl.
*G06F 1/16* (2006.01)
*A44C 5/00* (2006.01)

(52) U.S. Cl.
CPC .................................. *G06F 1/163* (2013.01)

(58) Field of Classification Search
CPC ...................................................... G06F 1/163
USPC ............... 361/679.01–679.3, 679.55–679.59; 368/282, 281
See application file for complete search history.

(56) References Cited

U.S. PATENT DOCUMENTS

| | | | |
|---|---|---|---|
| 6,565,253 B1 | 5/2003 | Yang | |
| 7,111,978 B2 | 9/2006 | Gerber | |
| 7,506,269 B2 | 3/2009 | Lang | |
| 8,212,781 B2 | 7/2012 | Wong et al. | |
| 8,328,055 B1 * | 12/2012 | Snyder | A45F 5/00 224/197 |
| 8,624,836 B1 * | 1/2014 | Miller | G06F 1/163 345/157 |
| 9,118,750 B2 * | 8/2015 | Vossoughi | B60R 11/02 |
| 9,314,092 B2 * | 4/2016 | Wang | A45F 5/00 |
| 9,318,907 B2 * | 4/2016 | Huang | H02J 7/0045 |
| 2001/0017663 A1 | 8/2001 | Yamaguchi et al. | |

(Continued)

FOREIGN PATENT DOCUMENTS

| | | |
|---|---|---|
| EP | 0603353 B1 | 10/1997 |
| WO | 2006093387 A1 | 9/2006 |

(Continued)

OTHER PUBLICATIONS

CENTR Camera, "CENTR: Interactive Panoramic Video in the Palm of Your Hand," <https://www.kickstarter.com/projects/1307511016/centr-interactive-panoramic-video-in-the-palm-of-y/>, retrieved Nov. 3, 2015.

(Continued)

*Primary Examiner* — Nidhi Thaker
(74) *Attorney, Agent, or Firm* — Bereskin & Parr LLP/S.E.N.C.R.L., s.r.l.

(57) ABSTRACT

Apparatus and methods for providing and using wearable computing devices. A wearable computing device with a device body and a removable face portion, where the removable face portion is removable yet operatively coupled with the device body. A display and sensor or sensors can be provided on the fact portion. The face portion, or a bezel of the face portion, can be rotated relative to the device body or the face portion.

19 Claims, 18 Drawing Sheets

(56) References Cited

U.S. PATENT DOCUMENTS

| | | | |
|---|---|---|---|
| 2002/0101457 A1 | 8/2002 | Lang | |
| 2013/0271447 A1 | 10/2013 | Setlur et al. | |
| 2014/0139422 A1* | 5/2014 | Mistry | G06F 3/014 345/156 |
| 2014/0375760 A1* | 12/2014 | Lee | H04N 5/23238 348/36 |
| 2016/0070234 A1* | 3/2016 | Lee | A44C 5/0007 368/282 |
| 2016/0098137 A1* | 4/2016 | Kim | G06F 1/1643 345/173 |
| 2016/0116944 A1* | 4/2016 | Lee | H04M 1/022 361/679.26 |

FOREIGN PATENT DOCUMENTS

| | | |
|---|---|---|
| WO | 2013153266 A1 | 10/2013 |
| WO | 2013177597 A1 | 11/2013 |

OTHER PUBLICATIONS

Moog, "Fiber Optic Rotary Joints," <http://www.moog.com/products/fiber-optic-devices/fiber-optic-rotary-joints/>, retrieved Jun. 25, 2014.

\* cited by examiner

MODULAR WEARABLE COMPUTING DEVICE

CROSS-REFERENCE TO RELATED APPLICATIONS

This application claims the benefit of U.S. Provisional Patent Application No. 62/005,441, filed May 30, 2014. The entire contents of U.S. Provisional Patent Application No. 62/005,441 are incorporated herein by reference.

FIELD

The described embodiments relate to wearable computing devices and, in particular, to wearable computing devices with a reconfigurable face portion.

BACKGROUND

Wearable computing devices are generally electronic devices that may be worn by an individual on a body part, whether under, with or on top of clothing. Examples of wearable computing devices include, but are not limited to, smart watches, wristbands, necklaces, earpieces, glasses, helmets and clothing.

SUMMARY

In a first broad aspect, there is provided a wearable computing device comprising: a device body with a body portion communication interface; a removable face portion with a face portion communication interface removably and operatively couplable to the body portion communication interface; a display provided upon the removable face portion; and a processor operatively coupled to the display.

In some cases, the removable face portion is receivable in a mounting of the device body. In some cases, the mounting comprises a resiliently deformable clip, and wherein the resiliently deformable clip secures the removable face portion to the device body in a mounted position. In some cases, the removable face portion has an annular groove in an outer circumferential portion, and wherein the resiliently deformable clip comprises a flange that fits within the annular groove when in the mounted position.

In some cases, the processor is operatively coupled to the display via the body portion communication interface and the face portion communication interface. In some cases, the processor is provided in the device body.

In some cases, the wearable computing device further comprises a co-processor provided in the removable face portion.

In some cases, the wearable computing device further comprises at least one sensor provided on the face portion, the at least one sensor operatively coupled to the processor.

In some cases, the wearable computing device further comprises at least one sensor provided on the face portion, the at least one sensor operatively coupled to the co-processor.

In some cases, at least one of the face portion and a bezel is rotatable relative to the device body. In some cases, the bezel generally encompasses the face portion. In some cases, the bezel is rotatable in a plane generally parallel to the face portion.

In some cases, the at least one sensor comprises an image sensor. In some cases, the at least one sensor comprises an acoustic sensor.

In some cases, the display is rotationally coupled with the bezel. In some cases, the bezel is rotatable independently of the display.

In some cases, the wearable computing further comprises at least one output device provided in at least one of the face portion and the bezel.

In some cases, the wearable computing device further comprises an actuator configured to rotate the bezel. In some cases, the processor is configured to transmit at least one rotate signal to the actuator, the at least one rotate signal causing the bezel to rotate between a first angle and at least one second angle, and to transmit at least one capture signal to the image sensor, the at least one capture signal causing the image sensor to record an image when the bezel is rotated to each of the first angle and the at least one second angle.

In some cases, the face portion communication interface is one of a slip ring and a wiper contact, and wherein the body portion communication interface is another one of the slip ring and the wiper contact.

In some cases, the face portion communication interface is one of an optical receiver and an optical transmitter, and wherein the body portion communication interface is another one of the optical receiver and the optical transmitter.

BRIEF DESCRIPTION OF THE DRAWINGS

An example embodiment will now be described in detail with reference to the drawings, in which.

DESCRIPTION OF EXEMPLARY EMBODIMENTS

Figure 1:
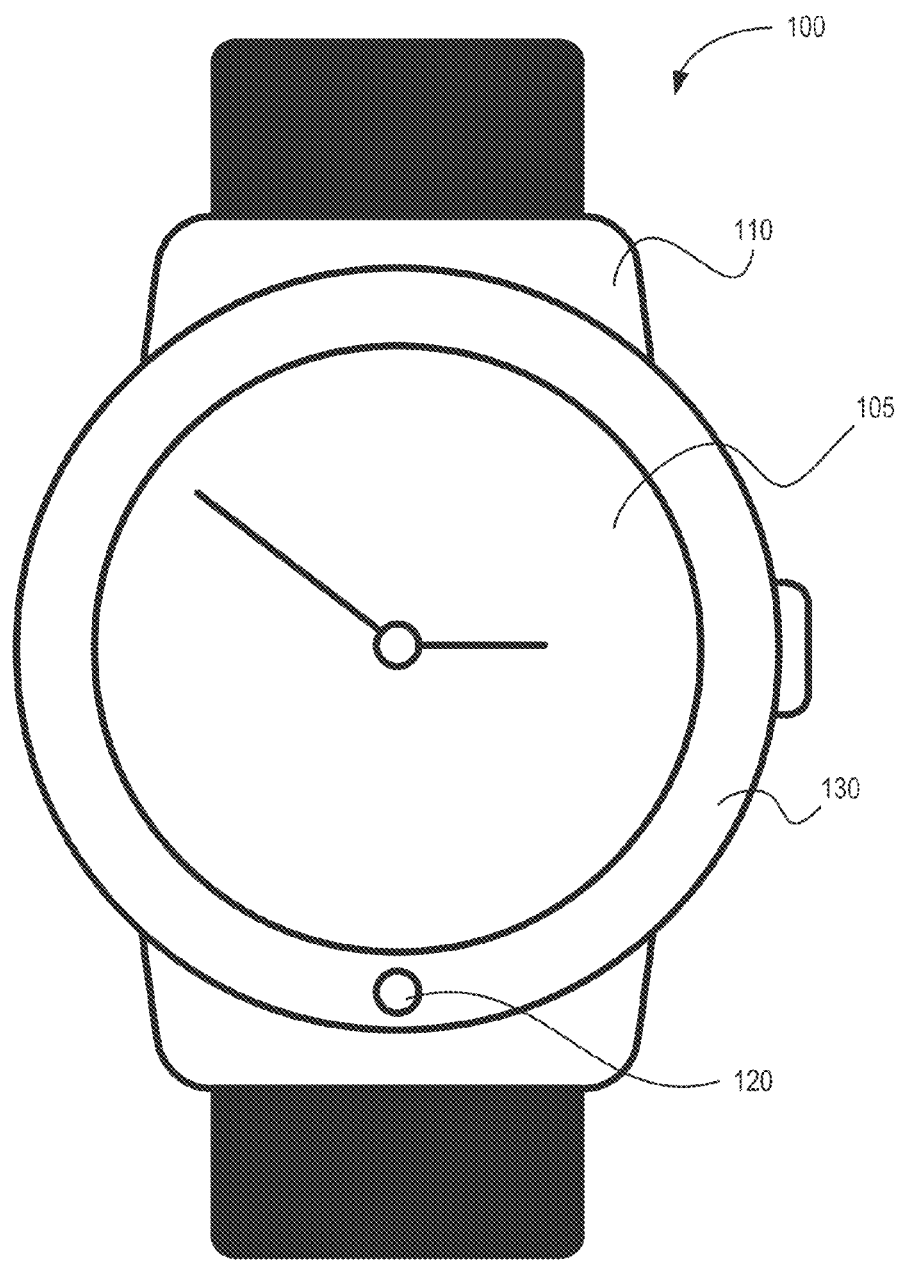
FIG. 1 is a plan view of a wearable computing device in one example embodiment.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein. Where considered appropriate, for simplicity and clarity of illustration, reference numerals may be repeated among the figures to indicate corresponding or analogous elements or steps.

The embodiments of the systems and methods described herein may be implemented in hardware or software, or a combination of both. However, preferably, these embodiments are implemented in computer programs executing on programmable computers each comprising at least one module component which comprises at least one processor (e.g. a microprocessor), a data storage system (including volatile and non-volatile memory and/or storage elements), at least one input device, and at least one output device. For example and without limitation, the programmable computers (referred to below as computing devices) may be a personal computer, personal data assistant, cellular telephone, smartphone device, tablet computer, wearable computer, smart watch, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Further, although method or process acts, algorithms or the like may be described (in the disclosure and or in the claims) in a sequential order, such processes, methods and algorithms may be configured to work in alternate orders. In other words, any sequence or order of acts that may be described does not necessarily indicate a requirement that the acts be performed in that order. The acts of processes described herein may be performed in any order that is practical. Further, some acts may be performed simultaneously.

The described embodiments generally relate to wearable computing devices and, in particular to smart wearable electronics. For example, the wearable computing devices may be smart watches that may target a premium segment of the smart watch market. In some cases, the computing devices may include smartphone-type functionality, in a small, rugged package and be positioned as a luxury accessory for sport enthusiasts.

Referring now to FIG. 1, there is illustrated a plan view of a wearable computing device in one example embodiment. In the example embodiment, the wearable computing device 100 is a smart watch, which includes a removable face portion 105 mounted on a device body 110. Optionally, the removable face portion 105 may have an integrated sensor 120, such as a camera. The removable face portion 105 may optionally have a rotatable bezel 130, into which the sensor 120 is integrated, allowing the sensor 120 to rotate with the bezel 130 relative to the face portion. In some embodiments, the entire face portion may be rotatable, and the bezel can be fixed to the face portion, or alternatively rotatable relative to the face portion (which face portion is itself rotatable). In some other embodiments, a rotatable bezel may be provided on the device body 110, rather than the face portion 105. Sensor 120 may be integrated into the rotatable bezel on the device body.

Figure 2A:
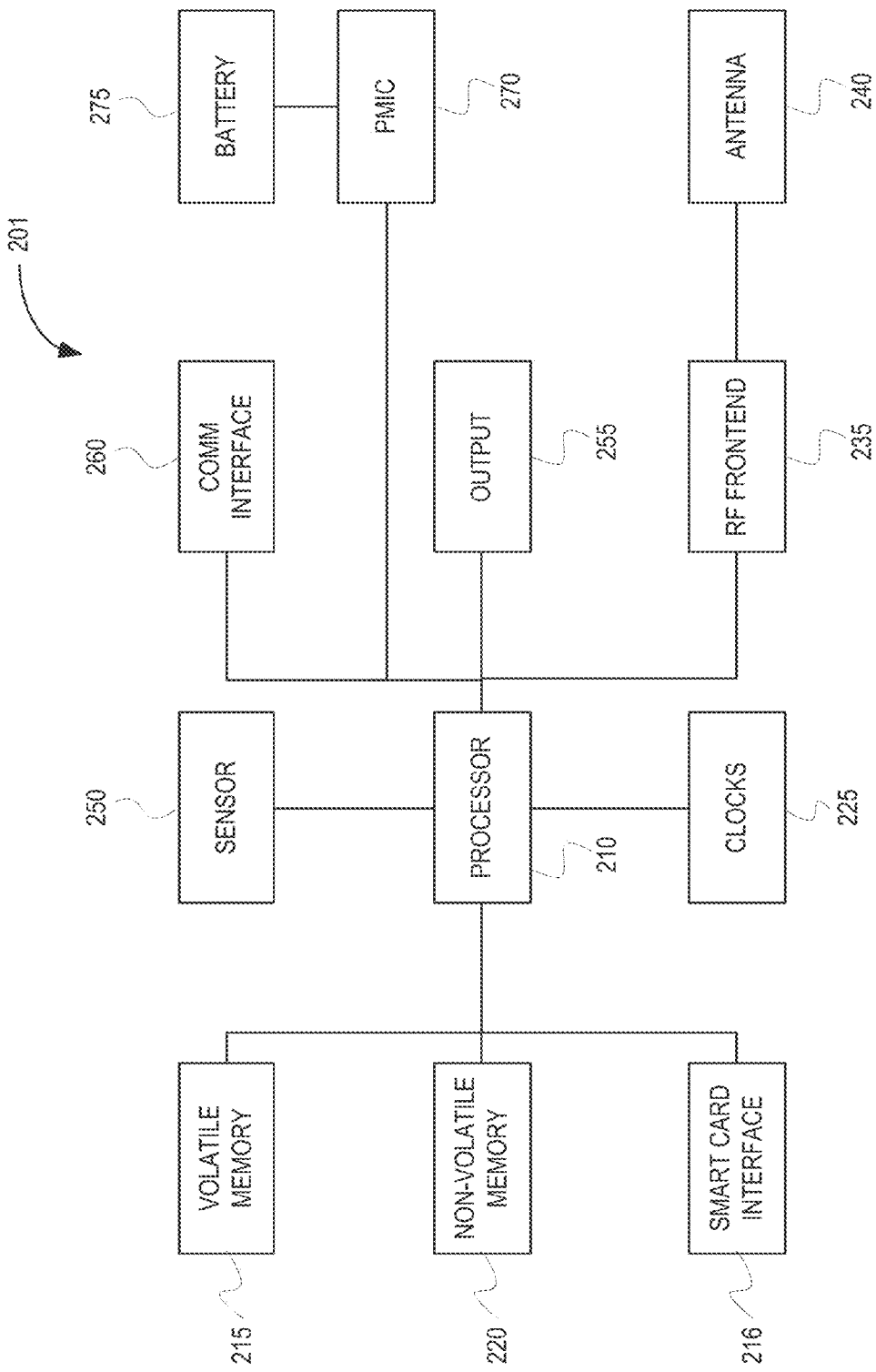
FIGS. 2A and 2B are system diagrams of the wearable computing device of FIG. 1.
Figure 2B:
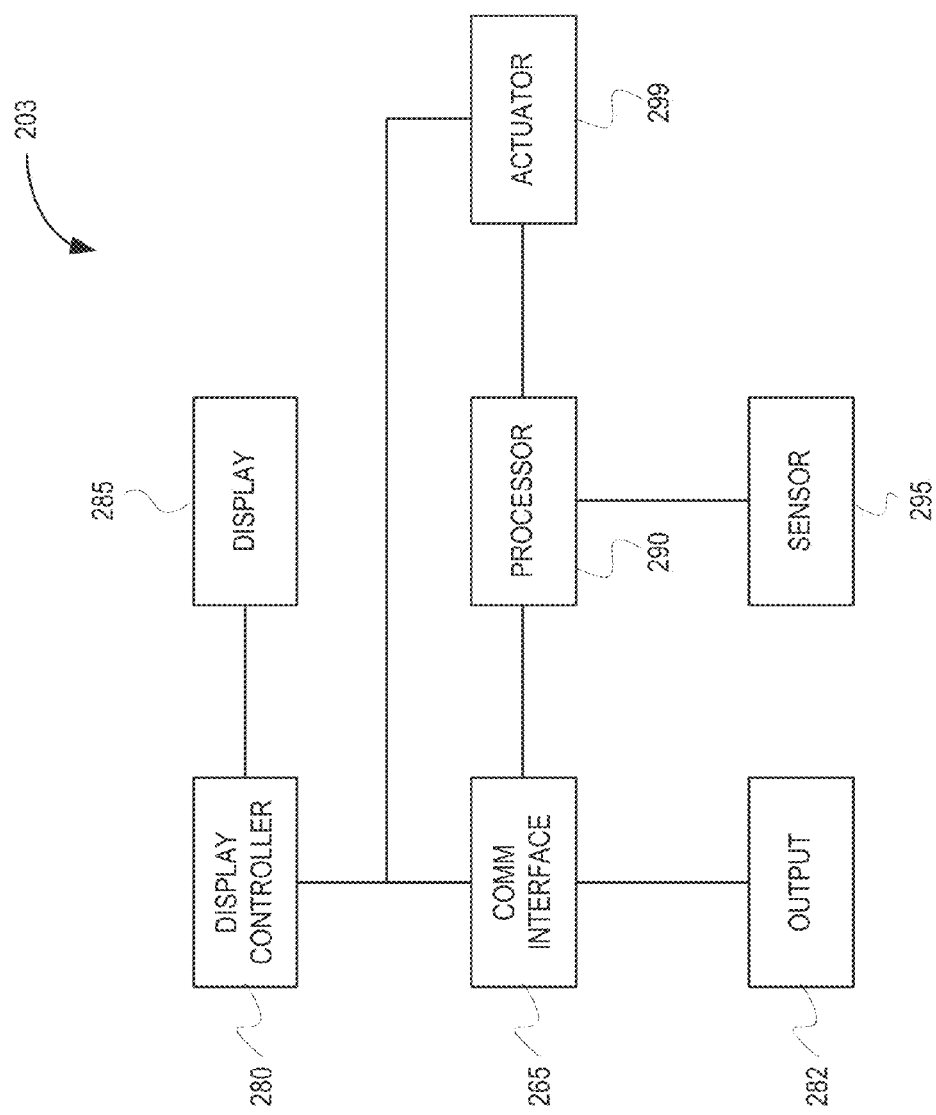

Referring now to FIGS. 2A and 2B, there are illustrated system diagrams of the wearable computing device of FIG. 1. Reference is first made to FIG. 2A, which illustrates an example system diagram for a device body of a wearable computing device, such as wearable computing device 100.

Device body 201 includes a processor 210, volatile memory 215, non-volatile memory 220, one or more clock source 225, one or more RF frontend 235, one or more antenna 240, a body portion communication interface 260, a power management circuit 270, a smart card interface 216 and a battery 275. Optionally, device body 201 may include at least one sensor 250 or output device 255.

Processor 210 may be a microprocessor or microcontroller, which is configured to carry out the functions described herein. In one example embodiment, the processor may be a Qualcomm Snapdragon™ S4 1.2 Ghz Dual-Core processor.

Volatile memory 215 may be random access memory (RAM) to temporarily store instructions and data for processor 210. In one example embodiment, between 1 and 4 GB of non-volatile memory may be provided.

Non-volatile memory 220 may be persistent storage memory for storing program instructions and data, such as an operating system and user data. In one example embodiments, 16 or 32 GB of flash memory may be provided.

In one example embodiment, the non-volatile memory 220 stores Android™ operating system software (e.g., Android™ Jelly Bean 4.3), and one or more application programs for executing, for example, photo/video capturing, social media applications, live video translation and recording, phone and teleconferencing applications, 3D inertial navigation, health telemetry and monitoring, and other applications. Wearable computing device 100 may be extensible, allowing the loading and execution of various other application programs by processor 210.

Clock source 225 may be any suitable oscillator or other dock source, for providing a timing signal to processor 210.

RF frontend 235 provides an interface between processor 210 and an antenna 240. Multiple RF frontends may be provided, which may be coupled to multiple antennas, depending on the number and type of RF communication protocols supported. For example, RF frontend 235 may be a Bluetooth™ frontend, supporting the Bluetooth™ 4.0 LE specification, an IEEE 802.11a/b/g/n/ac frontend, a near-field communication (NFC) frontend, or a cellular communication frontend, supporting, e.g., GSM/GPRS/EDGE, UMTS/HSPA+M/CDMA, and LTE on various frequencies.

Smart card interface 216 may be provided in some embodiments, and may be a connection interface for a Subscriber Identity Module (SIM) card, for example. The SIM card can be used to store information relating to a subscriber account, for example, for a cellular network. In some embodiments, the smart card may be a secure element, allowing mobile payments to be made when used in conjunction with an RF interface of the computing device.

One or more antenna 240 may be provided as needed by RF frontend or frontends 235. Antenna 240 may be located in any suitable position on the device, for example on upper edges or in a bezel portion.

Body portion communication interface 260 is an input/output (I/O) data communication interface, and may include a wired or wireless communication component, or both in some cases. For example, in some embodiments, body portion communication interface 260 employs a Universal Serial Bus (USB) protocol, which interfaces with a corresponding face portion communication interface 265, provided in face portion 203 and described in further detail herein.

Where data communication is performed electrically, the body portion communication interface may include or be coupled to a slip ring connector, while the face portion communication interface may include or be coupled to a wiper contact connector. The reverse arrangement can also be used.

In some other embodiments, I/O data communication may be performed wirelessly. For example, body portion communication interface 260 may include or be coupled to an optical (e.g., infrared) transmitter or receiver, which communicates with a corresponding optical transmitter or receiver in face portion 203. Likewise, instead of optical communication, radiofrequency communication may be used.

In embodiments where wireless data communication is used, a slip ring or other physical connection may nevertheless be used to transfer power to the face portion, or to charge a battery of the face portion.

At least one sensor 250 may be provided on or within device body 201, such as an image or video sensor (e.g., such as those manufactured by OmniVision Technologies, Inc.), microphone, inertial navigation sensor (e.g., such as manufactured by STMicroelectronics), temperature sensor, barometer, pressure sensor, ambient light sensor, electrocardiograph (ECG) monitor (e.g., such as manufactured by Mouser Electronics, Inc.), blood glucose sensor, etc. Health monitoring sensors may optionally be integrated into a wristband of the wearable computing device 100.

At least one output device 255 may be provided on or within device body 201, such as a speaker, vibrating indicator, light source, display, etc.

In general, device body 201 and wearable computing device 100 in general may be waterproof (e.g., up to IP67) or water resistant, and may be constructed from hypoallergenic materials.

Processor 210 may be operatively coupled to a power management circuit 270, which controls charging and discharging of a battery 275. In one example embodiment, battery 275 is a Lithium Polymer battery chosen to fit size constraints for wearable devices (e.g., such as manufactured by Huizhou Markyn New Energy Co., Ltd.). Although not shown in FIG. 2A, in some embodiments, device body 201 may also include inductive charging elements (e.g., such as manufactured by TDK Corporation) and inductive power management integrated circuits (e.g., such as manufactured by Texas Instruments, Inc.). A charging coil may be located on a main body portion of the device, and may be provided between the device body printed circuit board and device casing.

In some embodiments, various components may be distributed differently between the face portion 203, bezel and device body 201. For example, in some embodiments, the face portion 203 may include a camera sensor, either in place of, or in addition to, a camera sensor in the device body 201.

The described embodiments may use ultra high-density packaging for all integrated circuits, to fit within size constraints for wearable devices. For example, HDI multilayer printed circuit boards may be used, and custom RF shields may be used to prevent RF interference.

The described embodiments may generally provide for a sensor or output interface to be rotatably or removably coupled, or both, to the device body of the wearable computing device. In particular, in some embodiments, the face portion or the bezel portion, or both, are removably or rotatably couplable, or both, to the main body portion. The removability allows for other face portions or bezel portions to be attached as described further herein. For example, in some example embodiments, at least one sensor (e.g., camera) is provided on the face portion that is removable from the body. In some embodiments, the at least one sensor may be provided on the bezel portion, making it rotatable relative to the face portion, and thereby rotatable relative to the device body. Accordingly, in some embodiments, the face portion or the bezel portion, or both, are rotatable or removable, or both, relative to the device body.

Referring now to FIG. 2B, there is illustrated an example system diagram for a face portion of a wearable computing device, such as wearable computing device 100.

Face portion 203 includes an face portion communication interface 265, a display controller 280, a display 285, and at least one sensor 295. Optionally, face portion 203 may include at least one additional output device 282, or a co-processor 290. In some cases, an actuator 299 may also be provided.

At least one sensor 295 may be provided on or within face portion 203 or bezel 130, such as an image or video sensor (e.g., such as those manufactured by OmniVision Technologies, Inc.), microphone, inertial navigation sensor (e.g., such as manufactured by STMicroelectronics), temperature sensor, barometer, pressure sensor, ambient light sensor, electrocardiograph (ECG) monitor (e.g., such as manufactured by Mouser Electronics, Inc.), blood glucose sensor, etc.

In embodiments where face portion has a rotatable bezel, one or more sensor 295 may be provided on the rotatable bezel 130. In such cases, data communication between the sensor 295 and face portion 203 may be provided as described herein, in similar fashion as between face portion 203 and device body 201. In particular, data communication may be established electrically using slip rings and wiper contacts, or may be established optically using optical receivers, transmitters and optionally an optical collimator (which may be annular) to facilitate optical transmission.

The at least one sensor 295 may be controlled by a co-processor 290, which can interpret data from the at least one sensor 295 and transmit corresponding signals to processor 210. For example, if the at least one sensor 295 includes a video sensor, co-processor 290 may be configured to receive raw frame data from the video sensor and compress the raw frame data to produce a compressed video signal. Compression of the raw frame data thereby reduces the bandwidth requirements for the face portion communication interface.

In other embodiments, co-processor 290 may be omitted, and the at least one sensor 295 may communicate directly (via the data communication interface) with processor 210.

At least one output device 282 also may be provided on or within face portion 203 or bezel 130, such as an auxiliary display, speaker, vibrating indicator, light source, etc.

In general, face portion 203 and bezel 130, and wearable computing device 100 in general, may be waterproof (e.g., up to IP67) or water resistant, and may be constructed from hypoallergenic materials.

As noted above, face portion communication interface 265 may be a wired or wireless communication interface, which corresponds to the body portion communication interface 260 of device body 201.

Display 285 may be a thin-film transistor (TFT) liquid crystal display (LCD), light emitting diode (LED) display, e-Paper™ display or other suitable type of display. In general, display 285 has a resolution that enables the rendering of a user interface and user interface elements, such as buttons, graphics, text and the like. For example, in one embodiment, display 285 may have a resolution of 960×960 pixels.

Display 285 is controlled by a display controller 280, which may be a dedicated processor or co-processor that can interpret signals from processor 210 and generate the necessary control signals for display 285 to display the user interface. In some embodiments, display controller 280 may be omitted, and display 285 may be directly controlled by processor 210.

In some cases, face portion 203 may also include other processors, memory, a supplemental battery and other elements. Other types of interfaces, such as wireless or wired communication interfaces may also be included. A supplemental battery may also be included in the face portion 203, to allow the face portion 203 to operate independently of the device body 201. The wired or wireless communication interface may be used to communicate with another computing device, independently of the device body 201. For example, a USB interface may be used to charge the battery of the face portion 203, or to engage in data communication with a personal computer, laptop computer, peripheral device or the like.

In some embodiments, face portion 203 may be provided with some or all of the elements described herein as part of device body 201. This would allow the face portion 203 to have substantially all of the computing and communication abilities of the wearable computing device 200. Optionally, a user can remove the face portion 203 from the device body 201 and use the face portion 203 independently. For example, the face portion 203 may be removed and used as a standalone camera or speaker. In some cases, the removable face portion 203 can be interfaced with some other device, such as an appliance, computer, RFID reader, or the like, to provide other functionality.

Moreover, removability of the face portion 203 allows a user of the device to change the face portion 203 according to her needs. For example, a user may change the face portion 203 with another face portion that bears different markings or ornamentation (e.g., anti-glare glass, precious metals, colors, etc.). In other cases, a user may change the face portion 203 with a newer face portion that includes an improved sensor or output device (e.g., higher resolution camera sensor). Removability and the accompanying replaceability also allows a user to replace a face portion 203 that becomes damaged.

In some embodiments, the face portion 203 (and the device body 201) need not be generally circular. Rather, the face portion 203 and device body 201 can have rectangular or other irregular shapes, depending on the desire of the user and device designer.

In embodiments that provide removability of the face portion 203, but do not provide rotatability, connections between the face portion 203 and device body 201 may be simplified.

Optionally, an actuator 299 may be provided in face portion 203. Actuator 299 may be a motor, for example, engaged with a gear of the face portion 203 or a bezel of face portion 203. In response to a rotate signal from processor 210, actuator 299 may cause rotation of the bezel of the face portion 203, for example. Alternately, actuator 299 may be positioned to rotate face portion 203 itself, with respect to device body 201. Accordingly, the rotate signal can cause the bezel (or face portion) to rotate between a first angle and at least one second angle.

In conjunction with the actuated rotation, processor 210 can transmit capture signals to at least one sensor (e.g., image sensor), to capture images at rotational intervals, thereby forming a series of panoramic images or video.

In some embodiments, a bezel portion communication interface (not shown) may be provided, which is analogous to the face portion communication interface and body portion communication interface. The bezel portion communication interface can communicate data or power between the bezel and face portion, in similar fashion as between the face portion and body portion, for example, using a slip ring and wiper contact, or optical transmission.

Figure 3A:
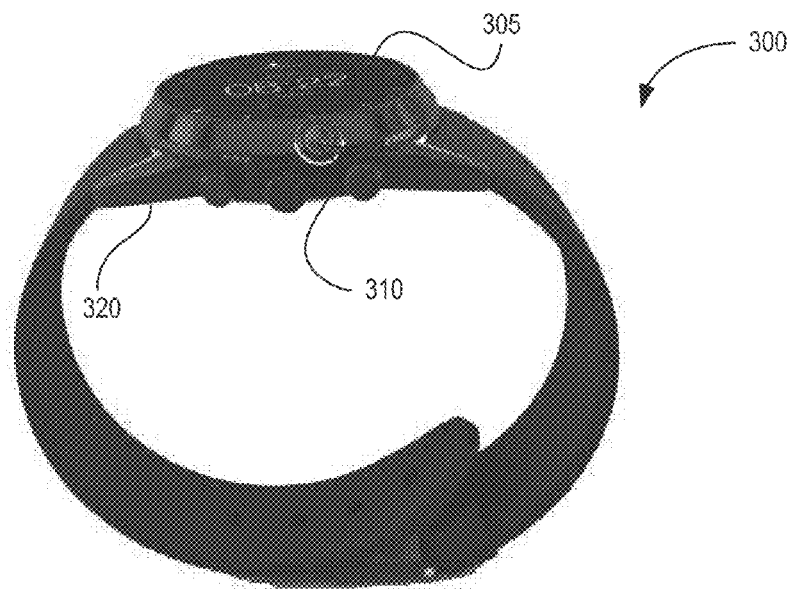
FIGS. 3A and 3B are photographic renderings of a wearable computing device in accordance with an example embodiment.
Figure 3B:
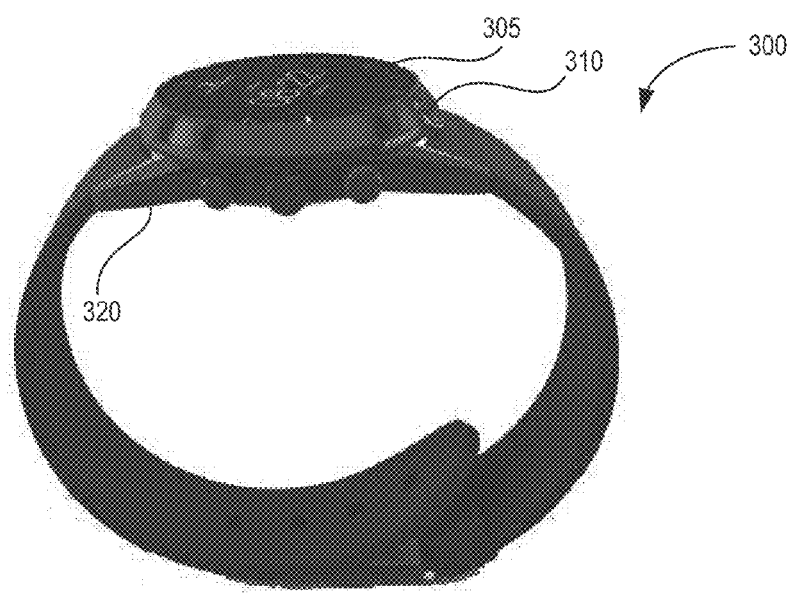

Referring now to FIGS. 3A and 3B, there are provided photographic renderings of a wearable computing device in accordance with an example embodiment. FIG. 3A illustrates a smart watch 300 with a bezel-mounted camera 310 (and face portion 305) in a first orientation relative to a device body 320. FIG. 3B illustrates the smart watch 300 with the bezel-mounted camera 310 (and face portion 305) in a second orientation relative to the device body 320, which is rotated relative to the first orientation. As illustrated, the bezel is fixed relative to the face portion 305, while the face portion 305 may rotate with the bezel portion. In some other embodiments, the face portion 305 may be fixed in position relative to the device body 320. In some embodiments, the user interface may remain oriented in a single direction relative to the device body 320, for example, by using software rotation of user interface elements to counteract physical rotation of face portion 305.

Referring now to FIGS. 4A to 4G, there are illustrated example embodiments of arrangements for the face and body portion communication interfaces for connecting the rotatable face portion 203 (or bezel) of a wearable computing device 100 to the device body 201.

Figure 4A:
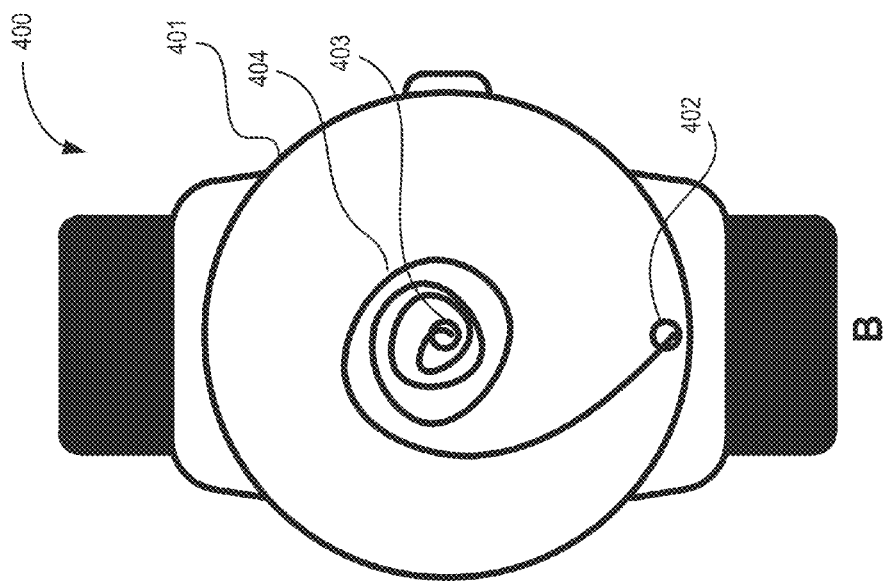
FIGS. 4A to 4F are simplified schematic diagrams of connection mechanisms for the wearable computing device of FIG. 1.
Figure 4A:
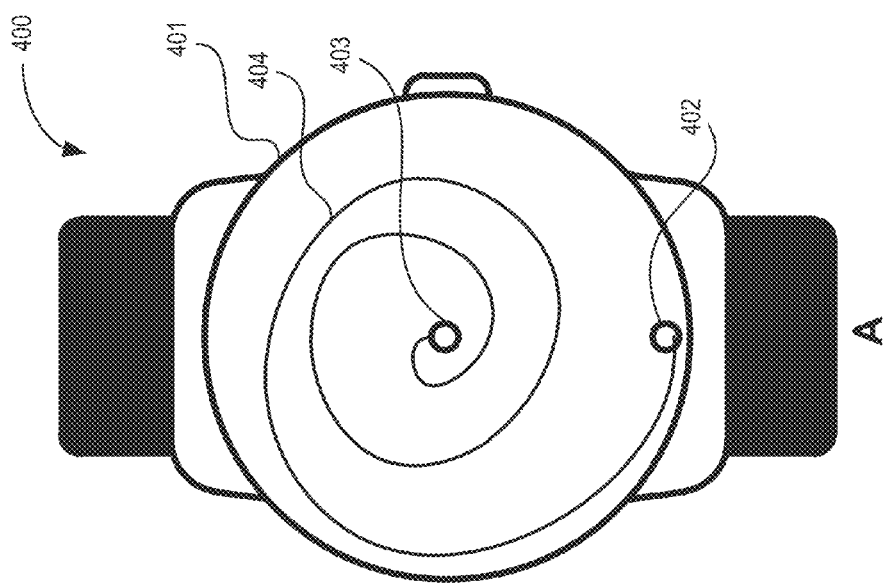

FIG. 4A illustrates a connection spring arrangement of a smart watch 400. Smart watch 400 includes a face portion 401, which has a face portion communication interface 402. A flexible printed circuit (FPC) 404 is electrically connected to the face portion communication interface 402, and also to a body portion communication interface 403, which acts as a central pivot point. The body portion communication interface 403 may be provided on face portion 401 and otherwise coupled to the device body. In some embodiments, the body portion communication interface 403 is provided on the device body, and passes through an aperture in the central region of face portion 401. The FPC 404 is loosely wound about the pivot point to facilitate rotation of the face portion 401.

The FPC material qualities allow it to be loosely coiled in a spiral, spring-like arrangement. The length of the FPC 404 may allow, for example, about 350° of rotation, with a fixed stop at the 12 o'clock position. The FPC 404 may carry power, data and control signals. FPCs with pitches of 0.3 mm and finer may be used, although other configurations are also possible. In some embodiments, a wire or wires may be used in place of an FPC.

A loosely coiled arrangement is illustrated in configuration A of FIG. 4A, while a more tightly coiled arrangement—representing rotation in the counterclockwise direction—is illustrated in configuration B of FIG. 4A.

In some embodiments, FPC 404 may be resiliently biased, but not wound about a central pivot point. For example, FPC 404 may be resiliently biased to a compressed position, but may expand when the bezel or face portion is rotated. This arrangement generally allows for less than 360 degrees rotation.

Figure 4B:
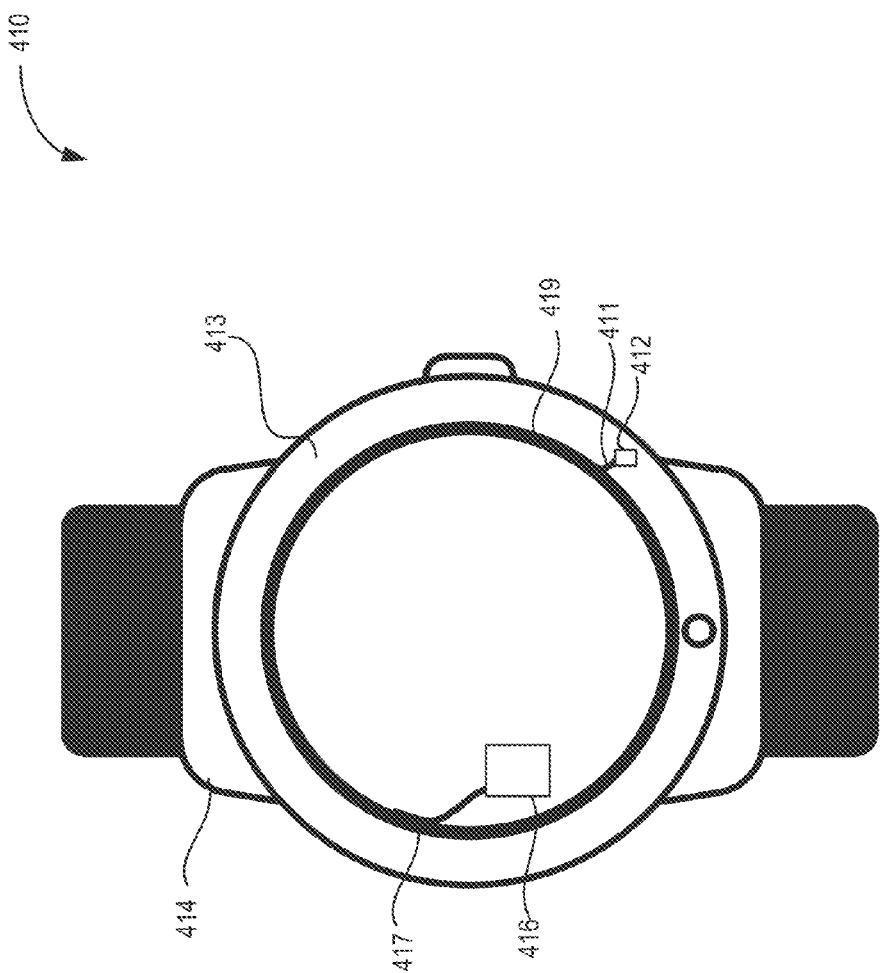

Referring now to FIG. 4B, there is illustrated a slip ring arrangement, in which one or more slip rings is provided on the device body, and wiper contacts are provided on the face or bezel portion.

Smart watch 410 has a device body 414 and a face portion 413. Device body 414 has at least one slip ring 419 provided on an upper side. A body portion communication interface 416 is electrically coupled to the slip ring 419 by a connector 417.

Face portion 413 has a face portion communication interface 412, which supports one or more wiper contacts 411, which are positioned to contact slip ring 419 when face portion 413 is mounted to device body 414.

Each wiper contact 411 may be a leaf spring, for example, which is biased to contact the slip ring 419. In other embodiments, a brush-type wiper contact 411 may be used. Still other wiper contacts may also be used.

As the face or bezel rotates, electrical coupling is maintained between wiper contact 411 and slip ring 419. In some embodiments, the wiper contacts and slip rings may be reversed (e.g., slip ring on face or bezel, wiper contact on main body).

In some embodiments, multiple slip rings (and corresponding wiper contacts) may be employed to transfer power, data and control signals between the device body 414 and the face portion 413. The slip rings 419 generally allow continuous rotation of the bezel or face portion 413.

Slip rings may be provided along an outer radial portion of device body 414, or centrally, or anywhere in between. A centrally positioned slip ring may be a contiguous contact pad, which can simplify construction in some cases.

In some cases, slip rings may be supplemented with optical connections to improve data transfer bandwidth. In particular, use of optical data transmission allows for greater data transfer speeds (e.g., between camera sensor and processor) and increased reliability. This hybrid arrangement uses slip rings for power transfer and optical transmission to transfer data at high speed from the rotating bezel or face portion to the main device body, enabling continuous rotation of the bezel.

Figure 4C:
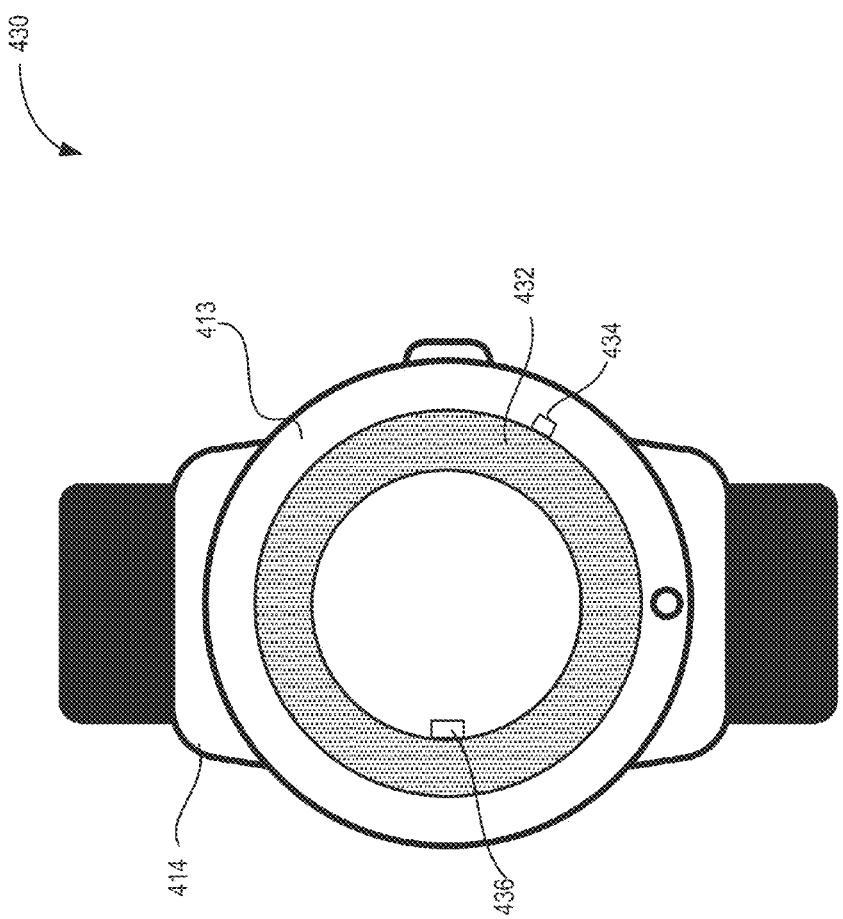

Referring now to FIG. 4C, there is illustrated a hybrid electrical-optical slip ring arrangement. A smart watch 430 is illustrated in which infrared transmitters and receivers are provided. Where the transmitters and receivers are not provided centrally, optical collimators may be used to allow optical data transfer regardless of relative orientation. Slip rings and wiper contacts are also used to provide power, however these are not shown in FIG. 4C so as not to obscure description of the optical communication arrangement.

Smart watch 430 also has a device body 414 and face portion 413. In addition, smart watch 430 has an annular optical collimator, which may be provided on face portion 413 or device body 414.

The optical collimator 432 is a medium that diffuses optical signals transmitted by an infrared transmitter 434 of face portion 413. An infrared receiver 436 of device body 414 detects signals diffused through optical collimator 432. Likewise, optical collimator 432 can diffuse optical signals transmitted by a transmitter of device body 414 for reception by a receiver of face portion 413.

Optical receivers and transmitters are positioned such that collimator 432 can receive and transmit signals. For example, transmitter 434 may be in a first layer directly above a second layer, which contains optical collimator 432. Receiver 436 may be in a third layer directly below the transmitter 434 and collimator 432. In other embodiments, a side-by-side arrangement may be used, in which transmitter 434 is positioned laterally beside optical collimator 432, and receiver 436 is also positioned laterally beside optical collimator 432. Various configurations and combinations of orientations may be used.

For bi-directional communication, each of device body 414 and face portion 413 may have respective transmitters and receivers, which can be configured to transmit and receive in a non-interfering manner. Optionally, additional slip rings may be provided for this purpose.

The optical interface allows high data rates to be achieved without the impedance matching, attenuation and crosstalk issues associated with wired systems.

Figure 4E:
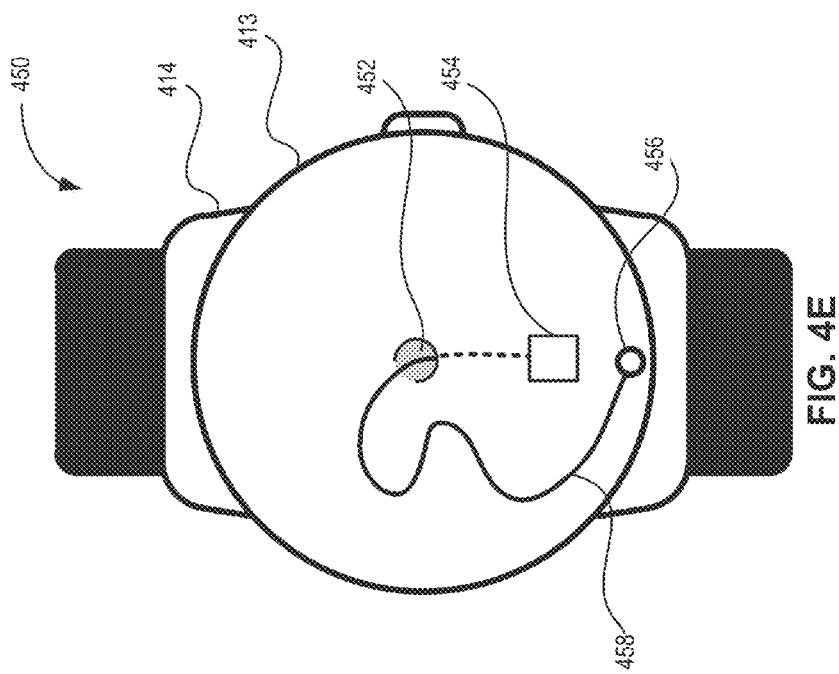
Figure 4D:
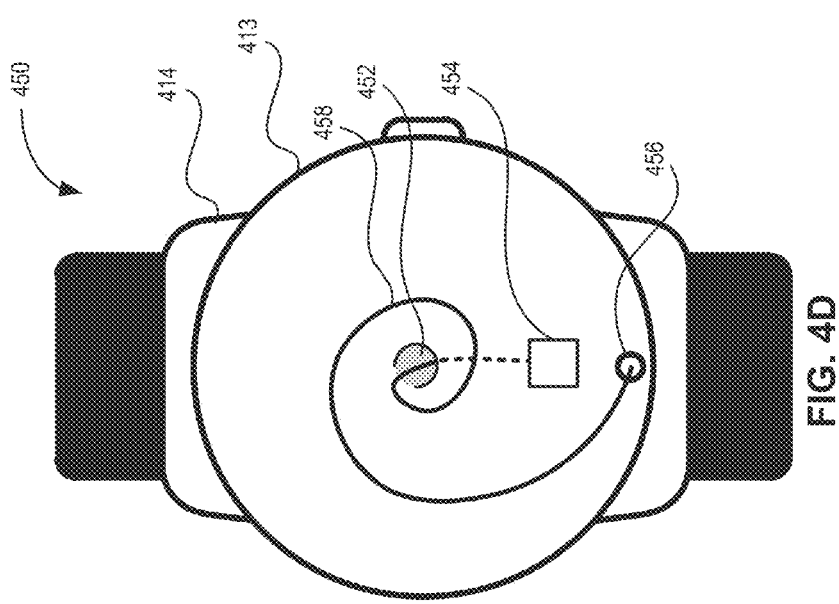
Figure 4F:
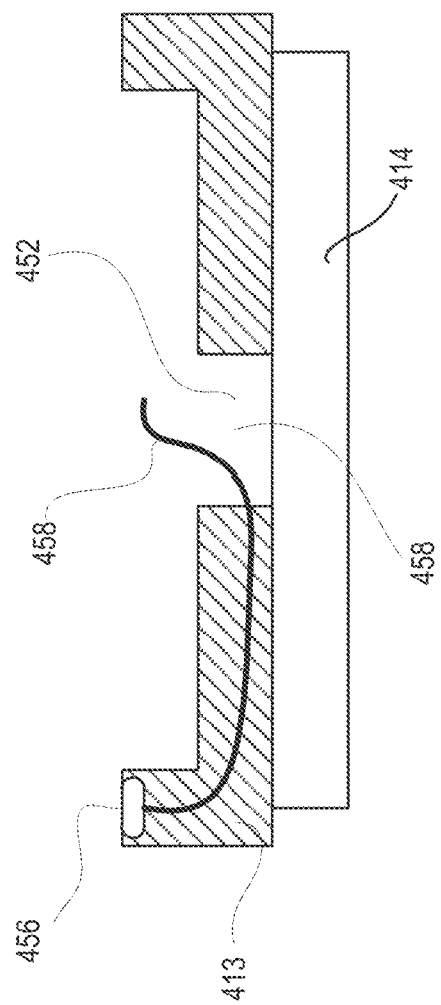

FIGS. 4D to 4F illustrate another wound wire arrangement, in which a centrally-positioned aperture is provided in the face or bezel portion. FIGS. 4D and 4E are plan views of a smart watch in different degrees of rotation, while FIG. 4F is a side cutaway view along a vertical centerline of the plan views of FIGS. 4D and 4E.

Smart watch 450 has a device body 414 and a face portion 413. Device body has a body portion communication interface 454 and has an I-shaped cross-section, with a central pivot 457. Face portion 413 has a face portion communication interface 456, a central aperture 452 and an annular flange 459. A flexible wire connector 458 connects face portion communication interface 456 and body portion communication interface 454, passing through aperture 452 and winding about pivot 457. The wire connector 458 may be a multicore cable, FPC or other wire.

Annular flange 459 fits into the I-shaped cross-section of device body 414. When the bezel is rotated fully counter-clockwise the cable coils around the main device body central pivot. When rotated clockwise the 'excess cable' is accommodated in the hollow bezel region. In the illustrated example, connector 458 can provide about 350° of bezel rotation. Routing the connector 458 close to the center of rotation minimizes the cable length requirement.

Figure 5:
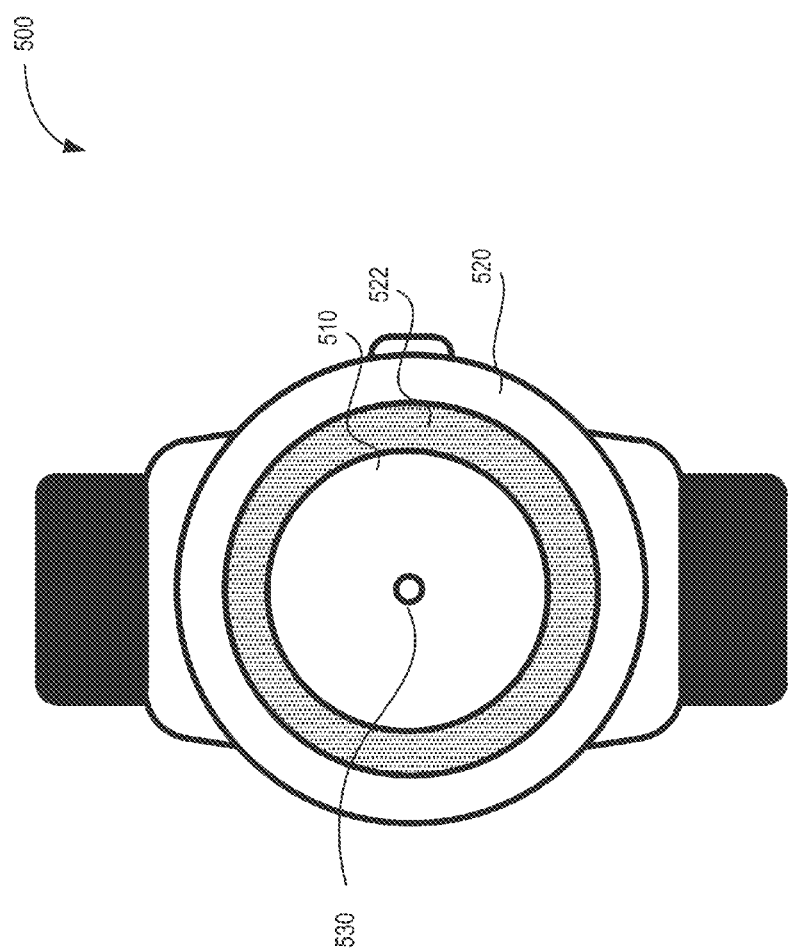
FIG. 5 is a simplified schematic diagram of an alternative connection mechanism for the wearable computing device of FIG. 1.

FIG. 5 is a plan view of an alternative embodiment employing a stacked printed circuit board arrangement 500. Smart watch comprises one or more stacked printed circuit boards of varying size. The printed circuit boards may be elliptically or circularly-shaped, and concentrically aligned along a common pivot point. One or more of the printed circuit boards may be rotatable relative to the other printed circuit boards. One or more of the printed circuit boards may be connected with one or more other circuit boards using one of the interconnection approaches described herein. In the illustrated example, a top printed circuit board 510 is stacked above an intermediate circuit board 522 and a bottom circuit board 520. A central port 530 may be provided as described elsewhere herein for interconnection between circuit boards.

Referring now to FIGS. 6A to 6D, there is illustrated an example embodiment in which the face or bezel portion is removably and operatively couplable to the device body of a wearable computing device.

Figure 6B:
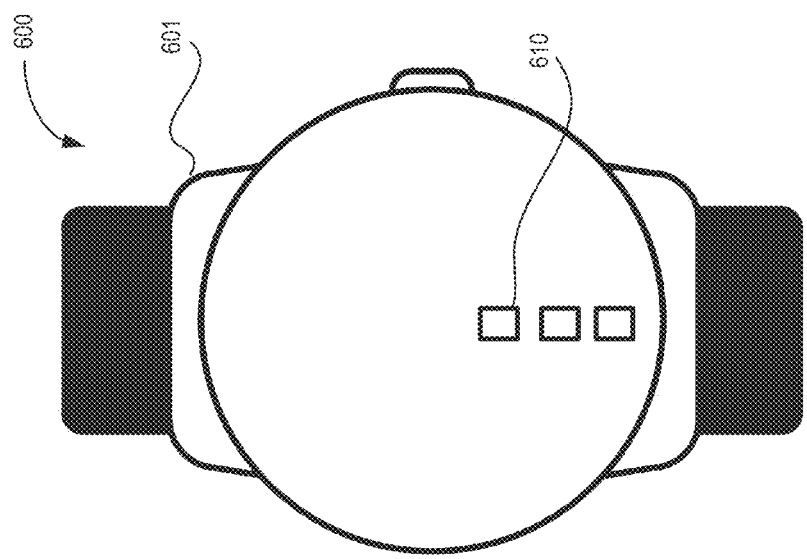
FIG. 6B is a cutaway plan view of the wearable computing device of FIG. 6A.
Figure 6A:
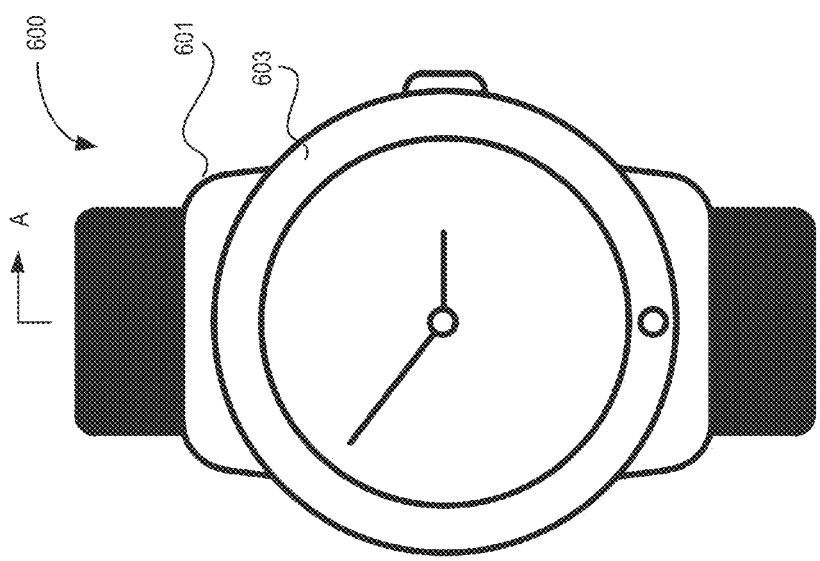
FIG. 6A is a plan view of a wearable computing device.
Figure 6D:
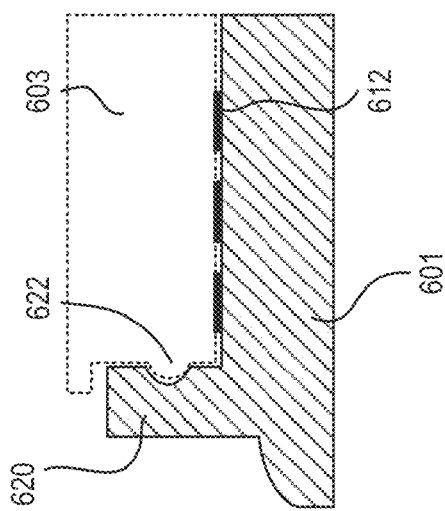
FIG. 6D is a cross-sectional view of the wearable computing device of FIG. 6A.
Figure 6C:
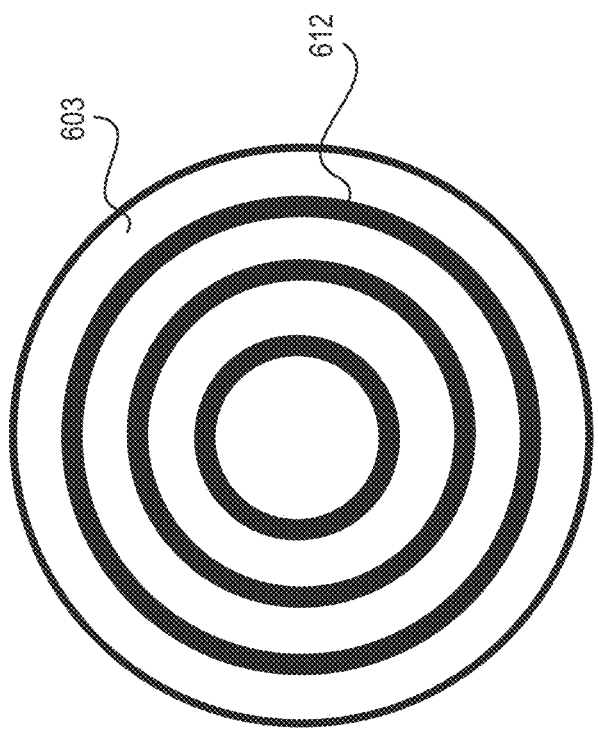
FIG. 6C is a bottom view of the face portion of the wearable computing device of FIG. 6A.

FIG. 6A is a plan view of a wearable computing device 600. FIG. 6B is a cutaway plan view of wearable computing device 600, in which a face portion 603 has been removed. FIG. 6C is a bottom view of the face portion 603. FIG. 6D is a cross-sectional view of the wearable computing device 600 along the line A-A of FIG. 6A.

Wearable computing device 600 has a device body 601 and a face portion 603, which is removable and rotatable relative to device body 601. Face portion 603 may have a display, at least one sensor, and other features, as described herein.

Device body 601 has a mounting for receiving the face portion 603. In the illustrated embodiment, the mounting is one or more resiliently deformable clip 620. Multiple clips 620 may be provided. Alternatively, clip 620 may be a single contiguous feature, which extends radially around an outer portion of device body 601.

The clip is resiliently deformable, such that clip 620 deforms when face portion 603 is inserted into the mounted position. An annular groove in an outer circumferential portion of face portion 603 mates with a flange portion of the clip, and secures the removable face portion 603 in the mounted position.

Device body 601 has one or more body portion communication interfaces 610, which may be coupled to brushes or wiper contacts in one configuration. Similarly, an underside of face portion 603 has one or more face portion communication interfaces 612, which may be coupled to concentric slip rings 612 in one configuration.

In some embodiments, the wiper contacts and slip rings may be reversed, such that the slip rings are provided on device body 601 and the wiper contacts on face portion 603.

While in the mounted position, the body portion communication interfaces 610 are operatively (e.g., electrically) coupled to face portion communication interfaces 612, allowing data communication to occur, while at the same time allowing face portion 603 to be freely rotated relative to device body 601.

Face portion 603 can be removed be pulling away from device body 601 until the mounting releases. In some embodiments, a release mechanism may be provided, such as a lever element. In some cases, a locking mechanism may also be provided, to prevent accidental release of face portion 603.

The illustrated example embodiment shows a clip-type mounting, however other mounting or removable fastening types may be used. For example, a latching mechanism, hook-and-loop fasteners, snap fasteners and still other mountings may also be used.

Figure 6E:
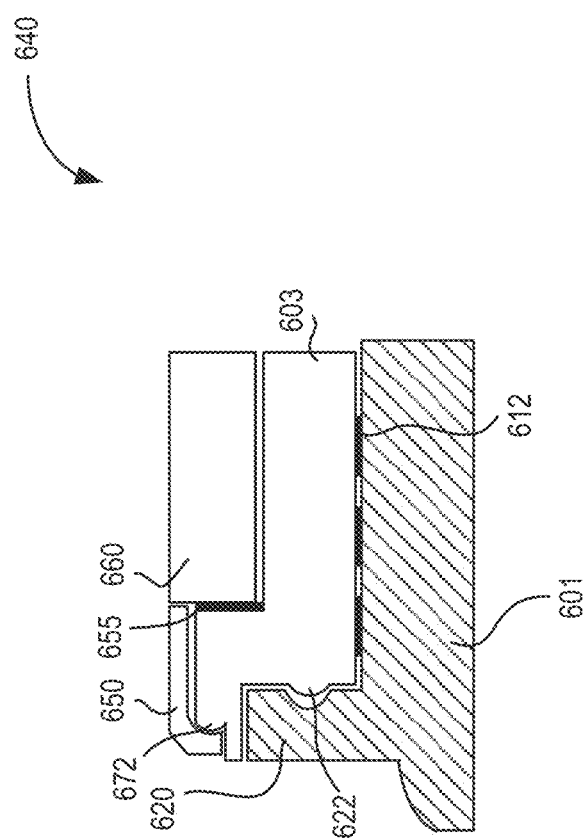
FIG. 6E is a cross-sectional view of another wearable computing device.

Referring now to FIG. 6E, there is shown another example embodiment of a wearable computing device. Wearable computing device 640 is generally analogous to wearable computing device 600. However, a rotatable bezel 650 is illustrated, which is fastened to a protrusion 672 of face portion 603 with a corresponding lip. A face crystal 660 is also shown, which is made water and airtight with a seal 655. Bezel 650 is rotatable relative to face portion 603, and face portion 603 may be rotatable relative to device body 601. In some embodiments, device body 601 may have threads (not shown), allowing face portion 603 to be screwed down onto device body 601.

Referring now to FIGS. 7A to 7D, there is illustrated another example embodiment in which the face or bezel portion is removably and operatively couplable to the device body of a wearable computing device.

Figure 7B:
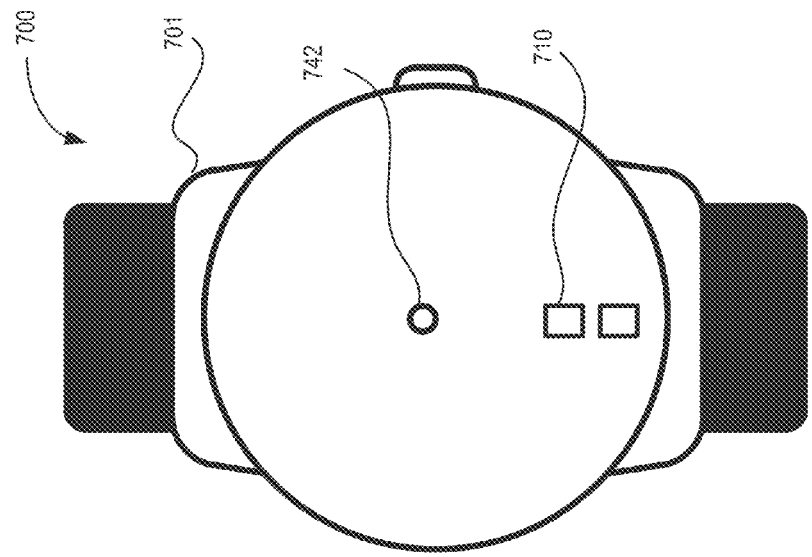
FIG. 7B is a cutaway plan view of the wearable computing device of FIG. 7A.
Figure 7A:
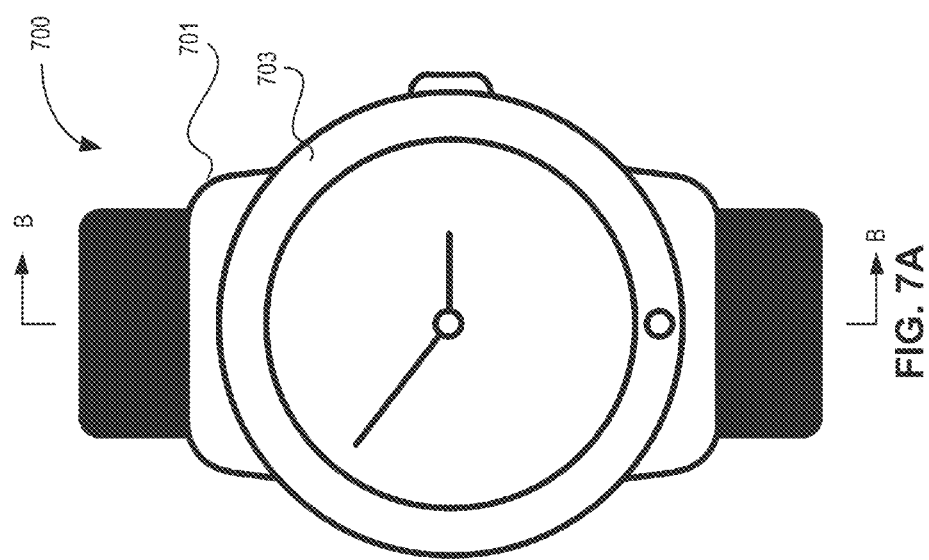
FIG. 7A is a plan view of a wearable computing device.
Figure 7D:
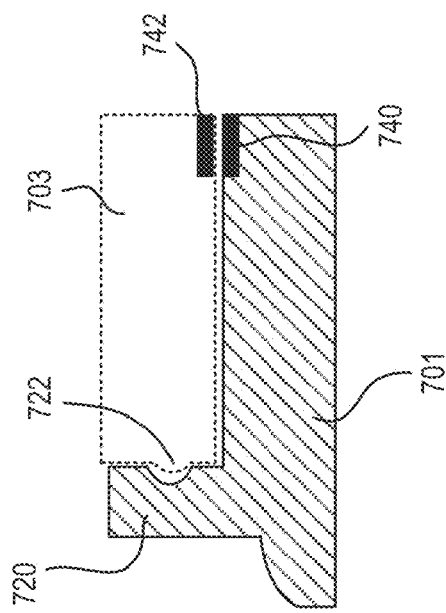
FIG. 7D is a cross-sectional view of the wearable computing device of FIG. 7A.
Figure 7C:
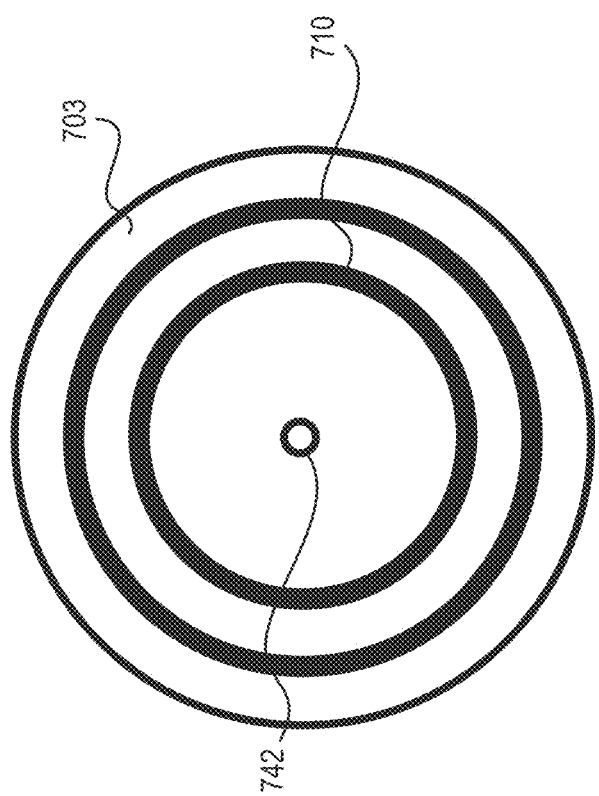
FIG. 7C is a bottom view of the face portion of the wearable computing device of FIG. 7A.

FIG. 7A is a plan view of a wearable computing device 700. FIG. 7B is a cutaway plan view of wearable computing device 700, in which a face portion 703 has been removed. FIG. 7C is a bottom view of the face portion 703. FIG. 7C is a cross-sectional view of the wearable computing device 700 along the line B-B of FIG. 7A.

Wearable computing device 700 has a device body 701 and a face portion 703, which is removable and rotatable relative to device body 701. Face portion 703 may have a display, at least one sensor, and other features, as described herein.

Device body 701 has a mounting for receiving the face portion 703. In the illustrated embodiment, the mounting is one or more resiliently deformable clip 720. Multiple clips 720 may be provided. Alternatively, clip 720 may be a single contiguous feature, which extends radially around an outer portion of device body 701.

The dip is resiliently deformable, such that dip 720 deforms when face portion 703 is inserted into the mounted position. An annular groove in an outer circumferential portion of face portion 703 mates with a flange portion of the clip, and secures the removable face portion 703 in the mounted position.

Device body 701 has one or more body portion power connectors 710, which may be brushes or wiper contacts in one configuration. Similarly, an underside of face portion 703 has one or more face portion power connectors 712, which may be concentric slip rings 712 in one configuration.

In some embodiments, the wiper contacts and slip rings may be reversed, such that the slip rings are provided on device body 701 and the wiper contacts on face portion 703.

While in the mounted position, the body portion power connectors 710 are operatively coupled to face portion power connectors 712, allowing power to be supplied to face portion 703, while at the same time allowing face portion 703 to be freely rotated relative to device body 701.

To provide data communication between device body 701 and face portion 703, a body portion communication interface 740 is provided, which is operatively coupled with a face portion communication interface 742. In some cases, body portion communication interface 740 and face portion communication interface 742 are, or are coupled to, optical transmitter-receivers to facilitate bi-directional communication. In some other cases, one or both communication interfaces may be unidirectional (e.g., transmitter only or receiver only), if bi-directional communication is not desired.

In some embodiments, body portion communication interface 740 and face portion communication interface 742 form parts of an optical rotary joint.

Body portion communication interface 740 and face portion communication interface 742 are positioned to facilitate transmission and reception of optical signals (e.g., infrared) regardless of the rotational orientation of face portion 703 with respect to device body 701. Accordingly, face portion 703 is freely rotatable relative to device body 701 without disrupting data communication.

In variant embodiments, body portion communication interface 740 may be a contact pad and face portion communication interface 742 may be a wiper contact or brush, or vice versa.

Face portion 703 can be removed by grasping and pulling it away from device body 701 until the mounting releases. In some embodiments, a release mechanism may be provided, such as a lever element. In some cases, a locking mechanism may also be provided, to prevent accidental release of face portion 703.

Figure 8:
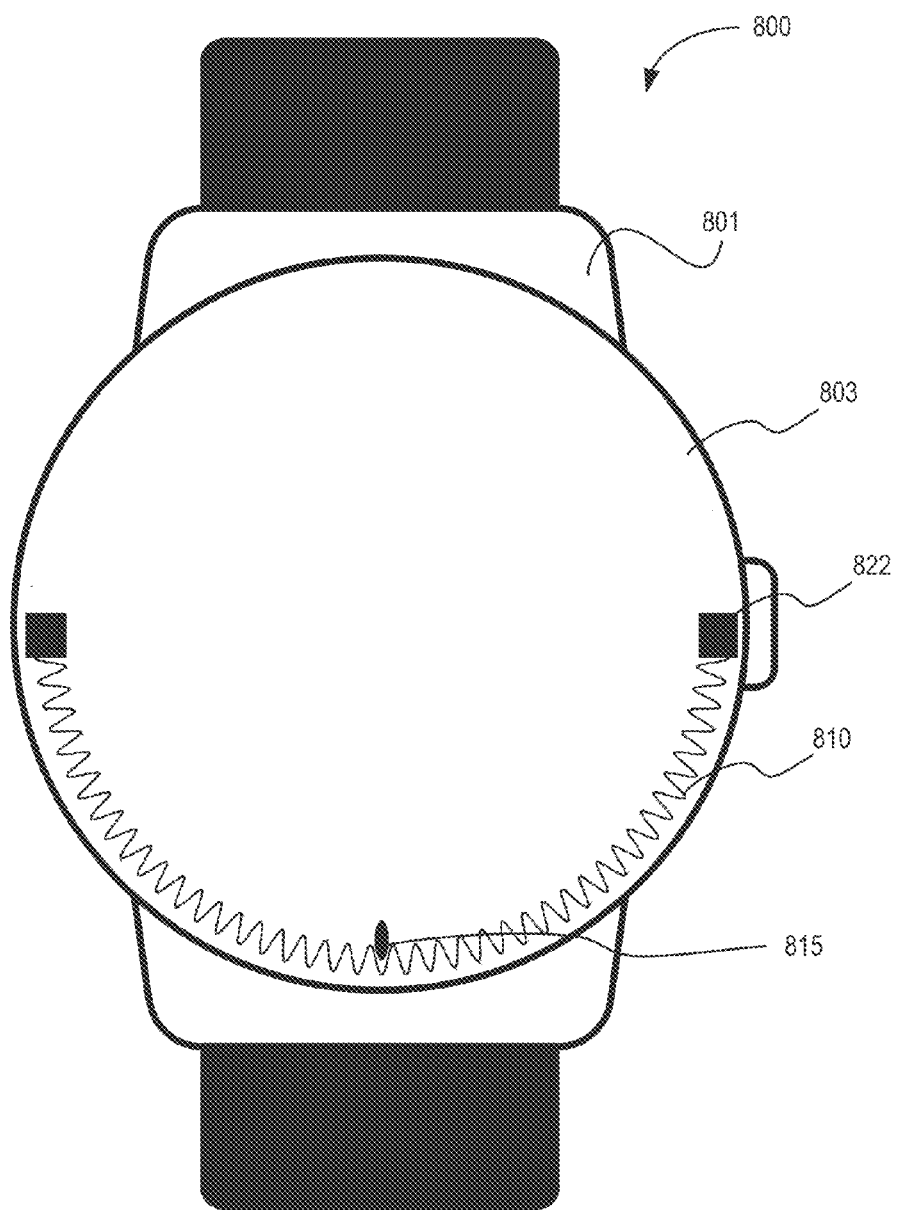
FIG. 8 is a cutaway plan view of a spring-snap rotation mechanism for a rotatable face portion of a wearable computing device.

Referring now to FIG. 8, there is illustrated an example rotation mechanism in accordance with some embodiments.

FIG. 8 is a cutaway plan view of a spring-snap rotation mechanism for a rotatable face portion 803 of a wearable computing device 800. A metal spring 810 may be formed with an undulating pattern, and provided along an outer annular portion of the face portion 803 or a bezel. One or more snap pins 815 may be provided on the device body 801, which are positioned to deform the spring 810 when the face or bezel is rotated. The spring 810 expands and compresses as it is pulled over the pin 815, and provides a biasing mechanism whereby the spring 810 is pulled to a compressed position. This provides a pleasing "snap" arrangement for the user.

In the illustrated example, spring 810 is anchored to a first anchor point 820 and a second anchor point 822. As illustrated, the mechanism may allow single axis through about 90° of rotation using a spring 810 mounted on an internal side of the face portion 803. A snap pin 815 provided on the device body 801 pulls and releases the curved segments of the spring 810, thus providing dedicated rotation step and position fixing.

Figure 9:
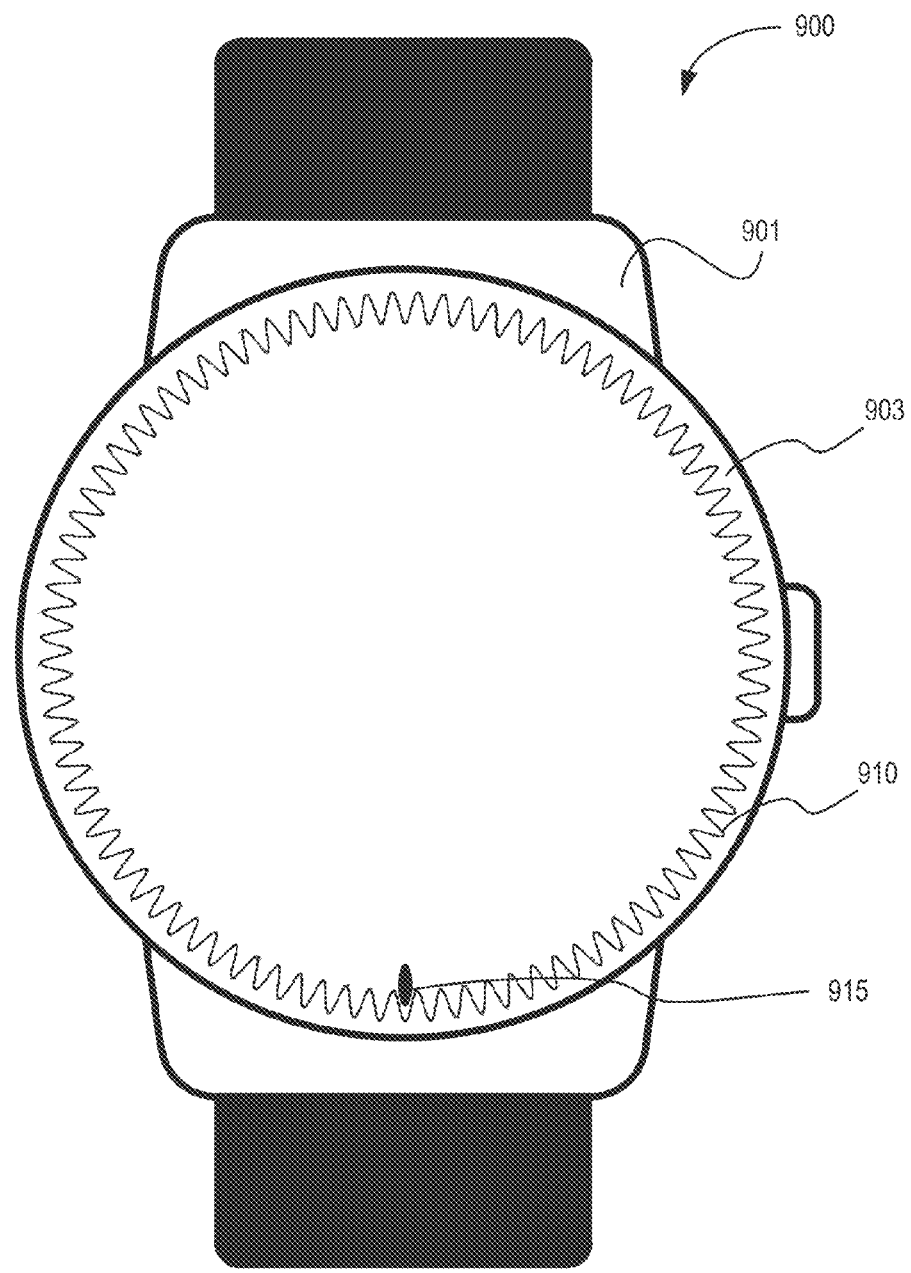
FIG. 9 is a cutaway plan view of another spring-snap rotation mechanism for a rotatable face portion of a wearable computing device.

FIG. 9 is a cutaway plan view of another spring-snap rotation mechanism for a rotatable face portion 803 of a wearable computing device 800, which may provide a full 360 degree range of rotation. A metal spring 910 may be formed with an undulating pattern, and provided along an outer annular portion of the face portion 903 or bezel. One or more snap pins 915 may be provided on the device body 901, which are positioned to deform the spring 910 when the face portion 903 or bezel is rotated. The spring 910 expands and compresses as it is pulled over the pin 915, and provides a biasing mechanism whereby the spring 910 is pulled to a compressed position. This provides a pleasing "snap" arrangement for the user.

In the illustrated example, the mechanism allows single axis through about 360° rotation using a spring 910 provided on an internal side of the face portion 903. A snap pin 915 provided on the device body 901 pulls and releases the curved segments of the spring 910, thus providing dedicated rotation step and position fixing.

The spring-snap mechanism of FIG. 8 or FIG. 9 may be used in conjunction with the various embodiments described herein, including embodiments that employ a central slip ring, optical transceiver, flexible PCB, etc.

As described with respect to FIGS. 2A and 2B, the wearable computing device may in some cases have an actuator, such as a motor, to rotate the bezel or face portion under the control of a processor.

Figure 10:
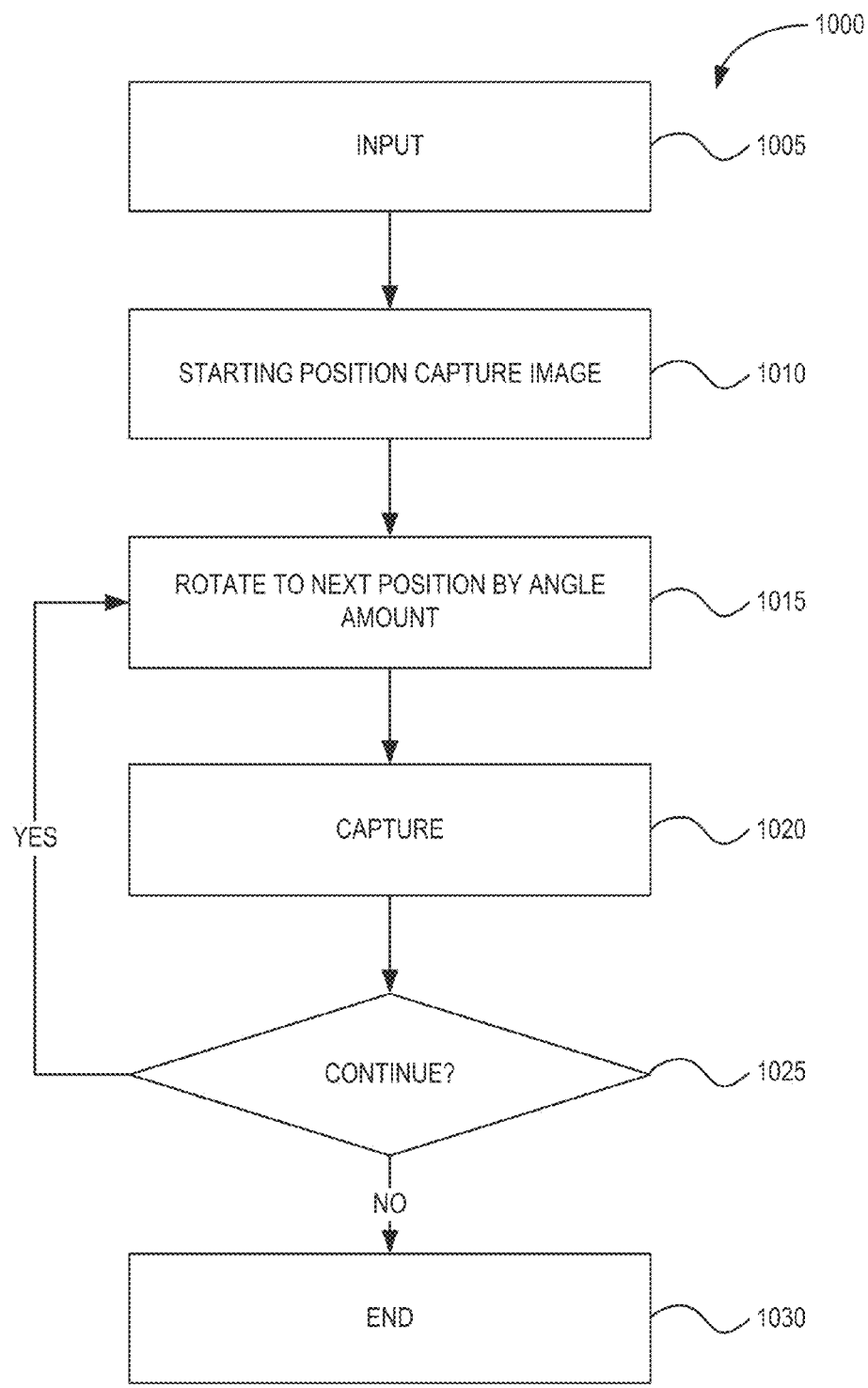
FIG. 10 is a simplified process flow diagram for an actuated image capture by a wearable computing device.

Referring now to FIG. 10, there is illustrated a simplified process flow diagram for an actuated image capture by a wearable computing device.

Process 1000 begins at 1005, with input provided to processor 210 to begin the actuated image capture. Input may be obtained, for example, through a user interface displayed on a display of the wearable computing device. Input may include, for example, an instruction to begin the process, a number of images to capture (or an instruction to record video continuously), a number of images to capture, and a rotation interval angle or a total rotation angle.

At 1010, processor 210 transmits a first signal to the actuator and image sensor, which may cause actuator to rotate the bezel or face portion to a first position and a first image may be captured.

At 1015, processor 210 determines the amount of rotation required to rotate to the next position. The next position may be determined according to the number of images and total rotation angle, or a rotation interval angle. Processor 210 transmits a rotate signal to the actuator, which rotates the face portion or bezel accordingly.

At 1020, processor 210 transmits a capture signal to the image sensor, which captures an image.

At 1025, processor 210 determines whether the number of images to capture has been reached, or whether a total rotation angle has been completed. If complete, the process ends at 1030, and processor 210 may stitch the images together into a panoramic view and store in memory, for example, or store the individual images in memory, or store video in memory. Otherwise, process 1000 may return to 1015 to continue rotating and capturing images.

Based on the input, the processor 210 can be configured to transmit rotate signals to the actuator, which cause the bezel or face portion to rotate between a first angle position and at least one second angle position, and to transmit at least one capture signal to an image sensor provided in the bezel or face portion. This causes the image sensor to record a series of images, which may be combined to form a 360 degree panorama image.

The present invention has been described here by way of example only, while numerous specific details are set forth herein in order to provide a thorough understanding of the exemplary embodiments described herein. For example, certain embodiments have been described with reference to a smart watch with camera sensor integrated in a face or bezel portion. However, it will be understood by those of ordinary skill in the art that these embodiments may, in some cases, be practiced without these specific details. For example, the camera sensor may be omitted in place of another input or output device, as described herein. In other instances, well-known methods, procedures and components have not been described in detail so as not to obscure the description of the embodiments. Various modification and variations may be made to these exemplary embodiments without departing from the spirit and scope of the invention.

We claim:

1. A wearable computing device comprising: a device body with a body portion communication interface; a removable face portion with a face portion communication interface removably and operatively couplable to the body portion communication interface; a display provided upon the removable face portion; and a processor operatively coupled to the display; at least one sensor provided on the face portion, the at least one sensor operatively coupled to the processor; wherein at least one of the face portion and a bezel is rotatable relative to the device body; and wherein based on an input provided via a user interface displayed on the display the processor is configured to transmit at least one rotate signal to an actuator, the actuator comprising a motor engaged with a gear of the face portion or the bezel, the at least one rotate signal causing the bezel to rotate between a first angle and at least one second angle, and to transmit at least one capture signal to the image sensor, the at least one capture signal causing the image sensor to record an image when the bezel is rotated to each of the first angle and the at least one second angle.

2. The wearable computing device of claim 1, wherein the removable face portion is receivable in a mounting of the device body.

3. The wearable computing device of claim 2, wherein the mounting comprises a resiliently deformable clip, and wherein the resiliently deformable clip secures the removable face portion to the device body in a mounted position.

4. The wearable computing device of claim 1, wherein the removable face portion has an annular groove in an outer circumferential portion, and wherein the resiliently deformable clip comprises a flange that fits within the annular groove when in the mounted position.

5. The wearable computing device of claim 1, wherein the processor is operatively coupled to the display via the body portion communication interface and the face portion communication interface.

6. The wearable computing device of claim 1, wherein the processor is provided in the device body.

7. The wearable computing device of claim 1, further comprising a co-processor provided in the removable face portion.

8. The wearable computing device of claim 1, further comprising at least one sensor provided on the face portion, the at least one sensor operatively coupled to the co-processor.

9. The wearable computing device of claim 1, wherein the bezel generally encompasses the face portion.

10. The wearable computing device of claim 1, wherein the bezel is rotatable in a plane generally parallel to the face portion.

11. The wearable computing device of claim 1, wherein the at least one sensor comprises an image sensor.

12. The wearable computing device of claim 1, wherein the at least one sensor comprises an acoustic sensor.

13. The wearable computing device of claim 1, further comprising at least one output device provided in at least one of the face portion and the bezel.

14. The wearable computing device of claim 1, wherein the face portion communication interface is one of a slip ring and a wiper contact, and wherein the body portion communication interface is another one of the slip ring and the wiper contact.

15. The wearable computing device of claim 1, wherein the face portion communication interface is one of an optical receiver and an optical transmitter, and wherein the body portion communication interface is another one of the optical receiver and the optical transmitter.

16. The wearable computing device of claim 15, further comprising a face power connector and a body power connector, and wherein the face power connector is one of a slip ring and a wiper contact, and wherein the body power connector is another one of the slip ring and the wiper contact.

17. The wearable computing device of claim 1, wherein the input comprises an indication of a number of images to be captured.

18. The wearable computing device of claim 1, wherein the input comprises an indication of a rotation interval angle between the first angle and each of the at least one second angle.

19. The wearable computing device of claim 1, wherein the input comprises an indication of a total rotation angle between the first angle and a final one of the at least one second angle.

* * * * *